Inventors
Byron B. Brenden
Jack C. Spanner

Attorney

June 11, 1968  B. B. BRENDEN ET AL  3,387,370
APPARATUS FOR MEASURING INCREMENTAL RADIAL
DISPLACEMENT OF A CHANNEL WALL
Filed Sept. 8, 1966  2 Sheets-Sheet 2
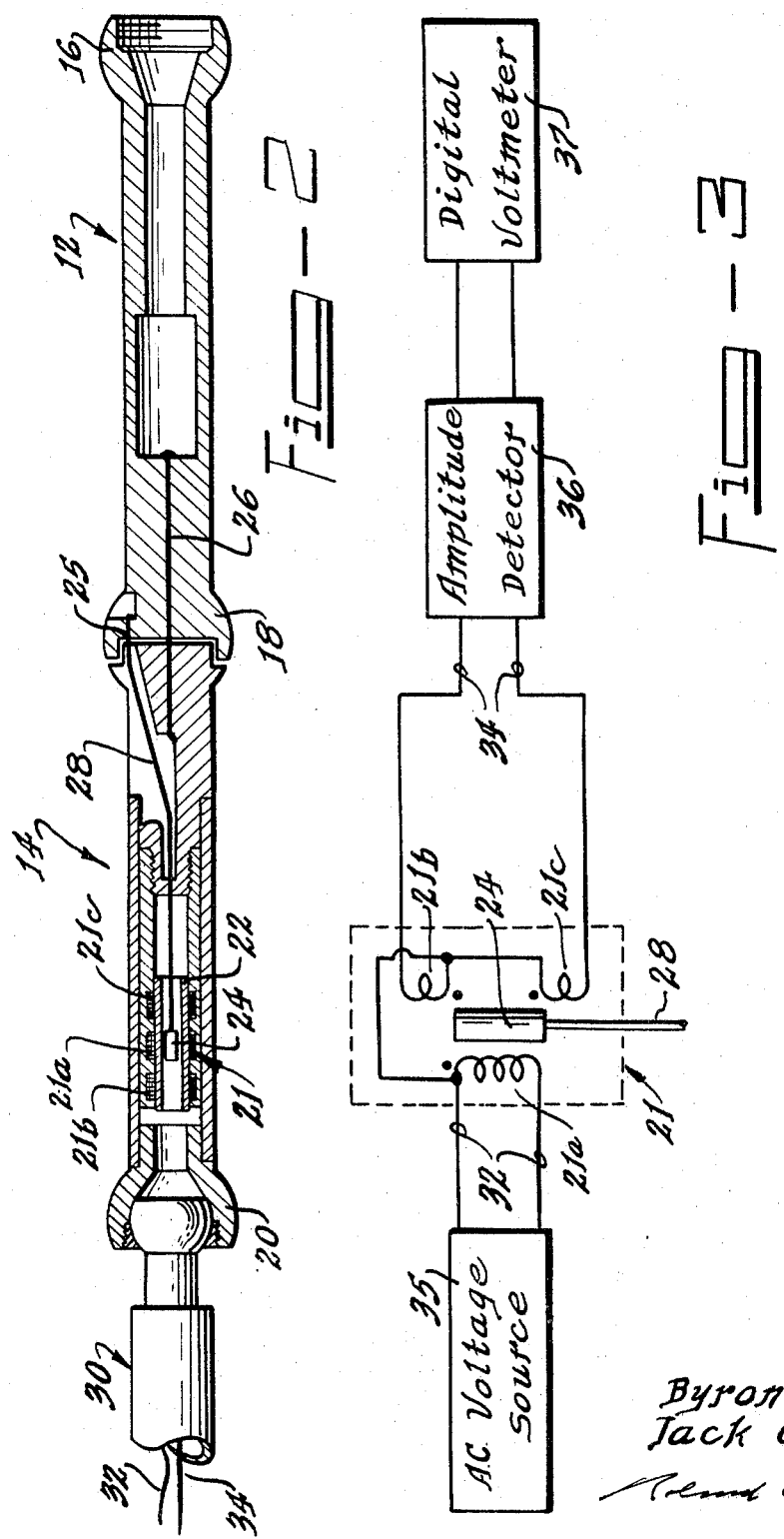
Inventors
Byron B. Brenden
Jack C. Spanner
Attorney United States Patent Office 3,387,370
Patented June 11, 1968

3,387,370
APPARATUS FOR MEASURING INCREMENTAL RADIAL DISPLACEMENT OF A CHANNEL WALL
Byron B. Brenden and Jack C. Spanner, Richland, Wash., assignors to the United States of America as represented by the United States Atomic Energy Commission
Filed Sept. 8, 1966, Ser. No. 578,432
1 Claim. (Cl. 33—1)

ABSTRACT OF THE DISCLOSURE

Apparatus for measuring bowing in long tubes such as nuclear-reactor process tubes. The apparatus comprises two rods with enlarged ends coupled in a universal joint by a flexible wire, a linear differential transformer located within one of the rods on its axis, and a rigid wire attached to a movable core of the transformer and extending through the one rod and connected to an adjacent end of the other rod at a region therewithin but offset from its axis.

---

The invention described herein was made in the course of, or under, a contract with the United States Atomic Energy Commission.

This invention relates to apparatus for measuring incremental radial displacement in a channel. More specifically, the apparatus measures radial displacement in a channel having its external surface inaccessible for measurement.

To determine the cumulative deformation or bowing, either vertical or horizontal, in long channels, such as nuclear reactor process tubes, a difficult problem is presented when the external surface of the channel in inaccessible for measurement. The problem is further complicated when bowing occurs in an amount greater than the diameter of the channel because then the line of sight is lost, thereby precluding the use of optical or surveying methods to determine bowing. In reactor process tubes, bowing of the tubes may be caused by nonuniform expansion of the graphite moderator. Since such bowing places a limit on the length of a fuel element that may be inserted in the tube without jamming against the internal walls at the smallest radius of curvature of the tube, the amount of such bowing must be accurately known.

It is therefore the main object of the present invention to provide apparatus for measuring the radial displacement of the wall of a channel.

It is another object of the present invention to provide apparatus capable of measuring radial displacement of the wall of a channel having its external surface inaccessible for measurement.

It is a further object of the present invention to provide apparatus for measuring radial displacement of the wall of a channel wherein the cumulative radial displacement along the length of the channel wall may be greater than the diameter of the channel.

Briefly, the above objects are accomplished by an articulate member having two segments in axial alignment when the member traverses a straight surface, the articulate member being adapted to traverse the length of the channel while engaging its inner surface. A transducer is inserted in one of the segments to generate a signal representative of the incremental radial displacement of the free end of one segment from the extension of the axis of the other segment. As the device traverses the length of a channel, the location of the remote end of the channel may be determined from a knowledge of the location of the near end of the channel and the cumulated incremental radial displacements of the channel wall measured by the device.

Further objects will be apparent and the invention better understood from the following detailed description accompanied by the attached drawings in which:

FIG. 2 is a sectioned schematic of apparatus according to the present invention.

FIG. 3 is an electrical block schematic of the transducer system of the device of FIG. 2.

Figure 1:
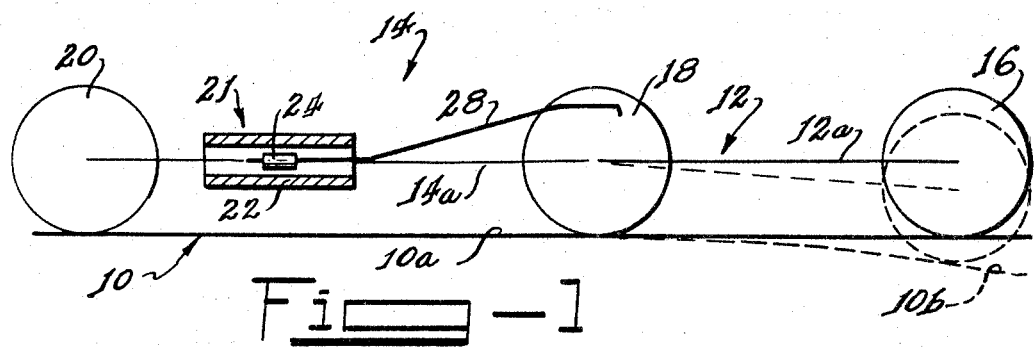
FIG. 1 is a partially sectioned schematic representation of a portion of a device illustrating the basic operating principle of the present invention.

Referring to FIG. 1, the surface of the wall of the channel whose displacement is to be measured is indicated by reference numeral 10. A first member, hereinafter referred to as the measuring section, is indicated by reference numeral 12. The axis of measuring section 12 is represented by the line 12a. A second member, hereinafter referred to as the reference section, is indicated by reference numeral 14 with its axis represented by the line 14a. The measuring section 12 and the reference section 14 are joined together in a manner, described in more detail below, which permits relative angular motion between their axes, but not relative longitudinal motion; together sections 12 and 14 form the articulate member referred to above.

Measuring section 12 engages the surface 10 by means of a measuring contact 16, which is illustrated in FIG. 1 for purposes of explanation, as a circular contact having its center mounted on the free end of the measuring section axis 12a. A circular center contact 18 joins the measuring section 12 and the reference section 14 with its center at the juncture of their respective axes, 12a and 14a. A circular reference contact 20 has its center mounted on the free end of the axis 14a of reference section 14. Contacts 16, 18 and 20 all have the same diameter.

A transformer 21 having a stationary member 22 and a movable core 24 is mounted on reference section 14. The stationary member 22 of transformer 21 is a hollow cylinder mounted co-axially with reference section 14. Movable core 24 of transformer 21 is a solid circular cylinder located co-axially with reference section 14 in the hollow of stationary member 22. One end of movable core 24 is attached by a rigid coupling wire 28 to measuring section 12 at a location displaced radially from its axis 12a in the plane of the page of FIG. 1.

As measuring contact 16, center contact 18, and reference contact 20 engage a straight surface, the axis 12a of measuring section 12 will be in alignment with the axis 14a of reference section 14. This is illustrated in FIG. 1 by a solid measuring contact 16 engaging a solid surface 10a. If the surface 10 is curved, as illustrated by the dashed line 10b, the measuring section axis 12a moves out of alignment with reference section axis 14a. This downward displacement of the center of measuring contact 16 is converted to a clockwise rotation of axis 12a about the center of center contact 18, thereby causing lateral translational motion of coupling wire 28 which pulls the movable core 24 of transformer 21 along axis 14a of reference section 14. This axial displacement of movable core 24 of transformer 21 is used to generate a signal, explained in more detail below, which represents the amount of displacement of movable core 24. This signal also represents the displacement of the free end of measuring section 12 relative to the projection of axis 14a.

Referring now to FIG. 2, a more complete device is illustrated. Measuring section 12 takes the form of a rigid straight rod which is coupled to reference section 14 (another rigid, straight rod) by a flexible wire 26 having strong resistance to torsional forces, which is embedded axially in both sections thereby forming a universal joint coupling members 12 and 14. This universal joint formed between measuring section 12 and reference section 14 by flexible wire 26 is considered an important feature and preferred embodiment of the present invention since it allows relative angular motion between the axes of the joined sections without axial play or rotational movement, and at the same time, insures an intersection of the axes 12a and 14a at a common point for small displacements of measuring contact 16.

The movable core 24, preferably made of a material having very high permeability for better sensitivity, is attached to measuring section 12 by means of a rigid coupling wire 28. As shown in FIGS. 1 and 2, coupling wire 28 is attached at one end to measuring section 12 at a location 25 above the axis 12a and runs generally parallel to the axis 14a until it angles downwardly to form an intersection with axis 14a, thereafter lying along axis 14a until it attaches to movable core 24.

It will be noted from FIGS. 1 and 2 that small vertical displacements of measuring contact 16 will move axis 12a out of alignment with axis 14a and cause the connecting point 25 between measuring section 12 and rigid coupling wire 28 to move parallel to reference section axis 14a which gives rise to a corresponding translational motion of coupling wire 28 without bending it. This will also translate movable core 24 along axis 14a. This characteristic, namely, that small displacements of the center of measuring contact 16 radially of axis 12a will cause a corresponding linear motion of the connecting point 25 parallel to axis 14a, which linear motion is perpendicular to the radial displacement of measuring contact 16 and gives rise to axial motion of movable core 24, is an important feature of the invention, and it is provided for in the illustrated embodiment by the rigidity of coupling wire 28. However, persons skilled in the art will readily recognize that minor variations will accomplish the same function. For example, the coupling member attaching core 24 to measuring section 12 could itself be articulate provided it were further constrained, as in a channel, to move the core 24 axially in response to small displacements of the point 25 at which the coupling member is connected to measuring section 12.

The transformer 21, which is of a conventional design commonly referred to as a linear differential transformer, has a primary winding 21a and two secondary windings 21b and 21c. Secondary windings 21b and 21c are distributed axially of stationary core 22; and, in the illustration, they are located symmetrically with respect to movable core 24 when the axes 12a and 14a are in alignment.

As noted above, downward displacement of measuring contact 16 will cause translation of rigid coupling wire 28 to pull the movable core 24 closer to transformer secondary winding 21c thereby providing a greater electromagnetic coupling between primary winding 21a and secondary winding 21c, and less electromagnetic coupling between primary winding 21a and secondary winding 21b. An upward displacement of measuring contact 16 forces movable core 24 closer to transformer secondary winding 21b thereby providing greater electromagnetic coupling between primary winding 21a and secondary winding 21b and less electromagnetic coupling between primary winding 21a and secondary winding 21c. Other things being equal, that secondary winding which has the greater electromagnetic coupling with primary winding 21a will also have the greater induced voltage when primary winding 21a is energized.

In the illustrated embodiment of FIG. 2, reference contact 20 is in the form of a socket of a ball joint receiving one end of a push rod 30 which is of the same length as measuring section 12. The other end (not shown) of push rod 30 is a socket of a ball joint receiving an extension rod (not shown) which is used to transmit axial force to the apparatus to move it across the surface 10 of a channel wall. The ball joints mentioned above are ideally suited to the use of the apparatus when the interior wall of the channel is in the form of a circular cylinder. The ball joints insure continuous contact with the interior channel surface. It will be obvious to adapt the device for other cross-sectional shapes of the channel (such as square, rectangular or elliptical) as well as for use on the external wall of a channel.

Push rod 30 and its associated ball joints permit the reference contact 20 to make true contact with the channel reference surfaces even though the push rod 30 is not axially aligned with the reference section 14. In the preferred embodiment, but not necessary for the practice of the invention, the lengths of measuring section 12, reference section 14, and push rod 30 are equal. It is noted that the length of a section refers to the axial length measured between the points about which it rotates.

Two sets of wires, indicated by numerals 32 and 34, run through the center of push rod 30 and reference section 14 to transformer 21.

Referring now to FIG. 3, transformer 21 and its associated circuitry are shown in electrical schematic. An alternating voltage source 35 excites primary winding 21a of transformer 21 via wires 32. Secondary winding 21b and secondary winding 21c are connected differentially, that is, such that a common excitation voltage applied to primary winding 21a will induce opposing voltages in the secondary windings 21b and 21c, and this induced voltage is transmitted along wires 34 to an amplitude detector 36 which converts the amplitude of the signal appearing on wires 34 to a DC signal which feeds digital voltmeter 37 to provide a visual readout. The voltage appearing on voltmeter 37 is representative of the amount of displacement of movable core 24. As explained below, it is not necessary that the net induced voltage at secondary leads 34 be zero when axis 12a is in alignment with axis 14a since a correction factor may be applied for a residual reading.

The transformer 21 has been illustrated as being mounted within reference section 14, but it can be seen that this is not necessary to the operability of the device. It may, for instance, be mounted within the measuring section 12 with coupling wire 28 connected to a corresponding location on the reference section 14.

The device, as illustrated in the drawings, is suited to measure axial displacement in only one plane, but it is well within the skill of the art to adapt it to measure radial displacement from the axis 12a in any plane by merely outfitting the device with a second transducer adapted to measure displacements in a plane perpendicular to the plane of the page of FIG. 2. Also, of course, the device can be rotated in order to obtain a measurement in any desired plane.

Figure 4:
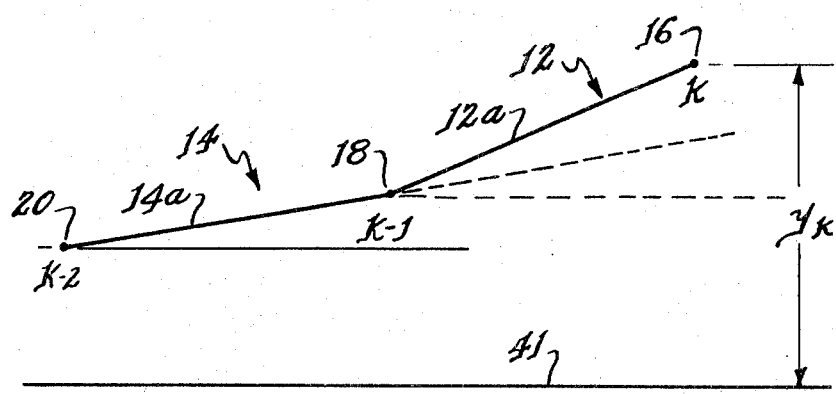
FIG. 4 is a line diagram illustrating a method of determining incremental radial displacement of a chanel wall using the device of FIG. 2.
Figure 5:
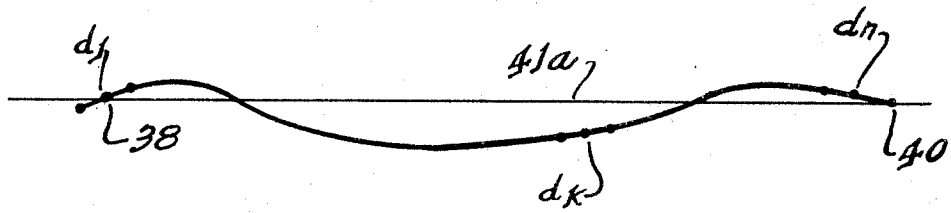
FIG. 5 is a line diagram illustrating a method of computing the deformation or bowing of an entire channel using the device of FIG. 2.

FIGS. 4 and 5 illustrate the use of the present invention to measure the total deformation in a channel. The axes of the reference section 14 and measuring section 12 are represented respectively by the lines 14a and 12a. The centers of measuring contact 16, center contact 18, and reference contact 20 are diagrammatically represented respectively by the letters $k$, $k-1$, and $k-2$. Any $p_k$ deviation of the center $k$ of the measuring contact 16 from the extended axis of reference section 14 results in a reading, $d_k$, on digital voltmeter 37 (FIG. 3). This reading is corrected for the residual reading, $b$, if any, obtained when the axis 12a of measuring section 12 is aligned with the axis 14a of reference section 14. The corrected reading is multiplied by a scaling factor, A, chosen to make $$p_k = A(d_k - b) \quad (1)$$

A set of data, used to determine the total deformation of a channel or the displacement of one end of the channel with respect to the other, is obtained by moving the apparatus along the channel in increments, L, equal to the length of measuring section 12. This allows the center contact 18 to occupy the position previously occupied by measuring contact 16; likewise, reference contact 20 occupies the position previously occupied by center contact 18. At each rest position, a reading, $d_i$ is recorded, beginning with $d_1$ at the first position and ending with $d_N$ at the final position, as shown in FIG. 5.

FIG. 4 represents generally the position of the apparatus relative to a reference axis 41 during the $k^{th}$ reading. The total displacement, $y_k$, which represents the cumulative displacement in the plane of the page for the entire sequence of positions occupied by measuring contact 16, is given by the following expression:

$$y_k = Ay_{ok} - S_k M + kT + y_0 \quad (2)$$

where, $$y_{ok} = \sum_{j=1}^{k} \sum_{i=1}^{j} d_i \quad (3)$$

$$S_k = \tfrac{1}{2} k(k+1) \quad (4)$$

$$M = Ab \quad (5)$$

$$T = L\alpha_0 \quad (6)$$

Equation 2 has four constants A, M, T and $y_0$ which must be specified before displacements can be computed. The constants A and M are related to the construction of the device and are determined by calibration.

The constant $y_0$ locates the reference axis 41. It will have the value zero if the displacement of the channel is taken to be zero at the position of the center contact 18 at the first reading.

The constant T is a product of the distance L, as defined above, and the angle, $\alpha_0$, that the reference section 14 makes with the reference axis 41 in the position of the first reading. Thus, T is a characteristic of the tube and will be different for each tube being measured.

The slope $\alpha_0$ of the reference section 14 relative to the reference axis 41 at the position of the first reading can be measured with a level if vertical bowing is being determined. A reference axis suitable for horizontal bowing measurements may be established with survey equipment. Determination of the angle $\alpha_0$ is essential if the location of the far end of the tube is required.

The straight line drawn through the center (reference numeral 38 of FIG. 5) of the center contact 18 when the device is in the position for the first reading and through the center (reference numeral 40) of the measuring contact 16 when it is in the position for the last reading has been found to be a desirable choice of reference axis 41 for use in reactor tube bowing measurements. This particular reference axis is shown in FIG. 5 as 41a. It is represented in Equation a by setting $$y_0 = 0$$
$$y_N = 0$$

where N is the value of $k$ for the position of the last reading. Thus, if the constants A and M are known from a calibration of the device, the value of the only other constant T may be determined by solving Equation 2 for T and obtaining:

$$T = (S_N M - Ay_{oN})N^{-1} \quad (7)$$

A preferred method for calibrating the device is to run a traverse of a channel whose bowing can be measured by other means since this closely approximates the conditions of actual use.

If one is interested in determining only the sharpest bend along the length of the channel, the apparatus of the present invention is also quite useful. In this particular use, the radius of curvature, R, is related to the incremental radial displacement, $d_k$, of measuring contact 16 by the following expression:

$$R = L^2/d_k \quad (8)$$

Where both measuring section 12 and reference section 14 are of equal length L, so as to describe equal chords of an arc of a circle of radius R. The output of amplitude detector 36 (FIG. 3) could then be compared with a standard signal representative of the minimum acceptable radius of curvature. In this use, the apparatus would not have to traverse the channel wall incrementally, but could be continuously moved across it.

The invention is susceptible of various modifications and alternative constructions other than those illustrated in the drawings of the preferred embodiment, and it is to be understood that we do not intend to limit the invention to the specific forms disclosed, but intend to cover all modifications and equivalent structures falling within the spirit and scope of the invention as expressed in the appended claims.

The embodiments of the invention in which an exclusive property or privilege is claimed are defined as follows:

1. Measuring apparatus comprising:
   first and second rigid straight rods arranged end to end;
   a flexible wire having strong resistance to torsional forces and being embedded in the adjacent ends of the rods and extending along the axes thereof so as to couple the rods in a universal joint;
   a rigid wire having one end secured to and within the adjacent end of the first rod at a region offset from the axis of the first rod and extending through the adjacent end of the second rod in parallel offset relation to the axis thereof, thence within and along the second rod and at an angle to the axis thereof, and thence within the second rod and along the axis thereof;
   a linear differential transformer located within the second rod and extending along the axis thereof for sensing the angle between the axes of the rods, said transformer comprising a hollow cylinder, one primary and two secondary windings embracing the cylinder and distributed therealong, and a core located in the cylinder, movable along the axis of the second rod, and attached to the portion of the rigid wire extending along said axis.

References Cited
UNITED STATES PATENTS 3,263,332   8/1966   Plasser et al. _____ 33—145 X
3,264,682   8/1966   Freeman _____ 33—172

SAMUEL S. MATTHEWS, *Primary Examiner.*